United States Patent
Nittou (10) Patent No.: US 8,172,679 B2
(45) Date of Patent: May 8, 2012

(54) GAMING MACHINE

(75) Inventor: Eiji Nittou, Mie (JP)

(73) Assignee: Sharp Kabushiki Kaisha, Osaka (JP)

(*) Notice: Subject to any disclaimer, the term of this patent is extended or adjusted under 35 U.S.C. 154(b) by 586 days.

(21) Appl. No.: 12/377,834

(22) PCT Filed: May 23, 2007

(86) PCT No.: PCT/JP2007/060493
§ 371 (c)(1),
(2), (4) Date: Feb. 17, 2009

(87) PCT Pub. No.: WO2008/032474
PCT Pub. Date: Mar. 20, 2008

(65) Prior Publication Data
US 2010/0240452 A1    Sep. 23, 2010

(30) Foreign Application Priority Data

Sep. 11, 2006   (JP) ................................. 2006-245638

(51) Int. Cl.
*A63F 7/02*   (2006.01)
(52) U.S. Cl. .......................................................... 463/34
(58) Field of Classification Search ................... 463/30, 463/34
See application file for complete search history.

(56) References Cited

U.S. PATENT DOCUMENTS

| | | | | |
|---|---|---|---|---|
| 7,583,327 | B2* | 9/2009 | Takatani | 349/15 |
| 2005/0200781 | A1 | 9/2005 | Takatani | |
| 2008/0174516 | A1* | 7/2008 | Xiao et al. | 345/1.3 |
| 2010/0039418 | A1* | 2/2010 | Chen et al. | 345/208 |

FOREIGN PATENT DOCUMENTS

| | | |
|---|---|---|
| JP | 11-267305 A | 10/1999 |
| JP | 2002-248226 A | 9/2002 |
| JP | 2004-57394 A | 2/2004 |
| JP | 2004-180770 A | 7/2004 |
| JP | 2004-351143 A | 12/2004 |
| JP | 2005-84299 A | 3/2005 |
| JP | 2005-111067 A | 4/2005 |
| JP | 2005-258016 A | 9/2005 |
| JP | 2005-287716 A | 10/2005 |
| JP | 2006-20924 A | 1/2006 |

OTHER PUBLICATIONS

Yasuaki Kakehi et al., "Through the Looking Glass", The Journal of the Society for Art and Science, Sep. 20, 2004, vol. 3, No. 3, pp. 185 to 188.

* cited by examiner

*Primary Examiner* — Evan Pert
(74) *Attorney, Agent, or Firm* — Birch, Stewart, Kolasch & Birch, LLP

(57) ABSTRACT

In a gaming table (1), image light L1 emitted from a display surface of a liquid crystal module (2) that carries out a dual image display arrives, directly through a window of a frame (4b), at a player in front of the gaming table. Image light L2 emitted from the display surface of the liquid crystal module (2) is reflected by a reflecting surface of a mirror member (3) so as to also arrive at the player through the window of the frame (4b). The player recognizes a first image formed from the image light L1 and a second image formed from the image light L2. Thus, the first and second images are supplied to the player as a background image on the gaming table (1). This makes it possible to realize a gaming machine having a display device that can display a large screen and can reduce the size and cost of the gaming machine.

8 Claims, 9 Drawing Sheets

GAMING MACHINE

TECHNICAL FIELD

The present invention relates to a gaming machine including an optical display device.

BACKGROUND ART

A gaming machine including a projection type optical display device has been proposed as a pachinko machine, a slot machine, and the like.

Figure 8:
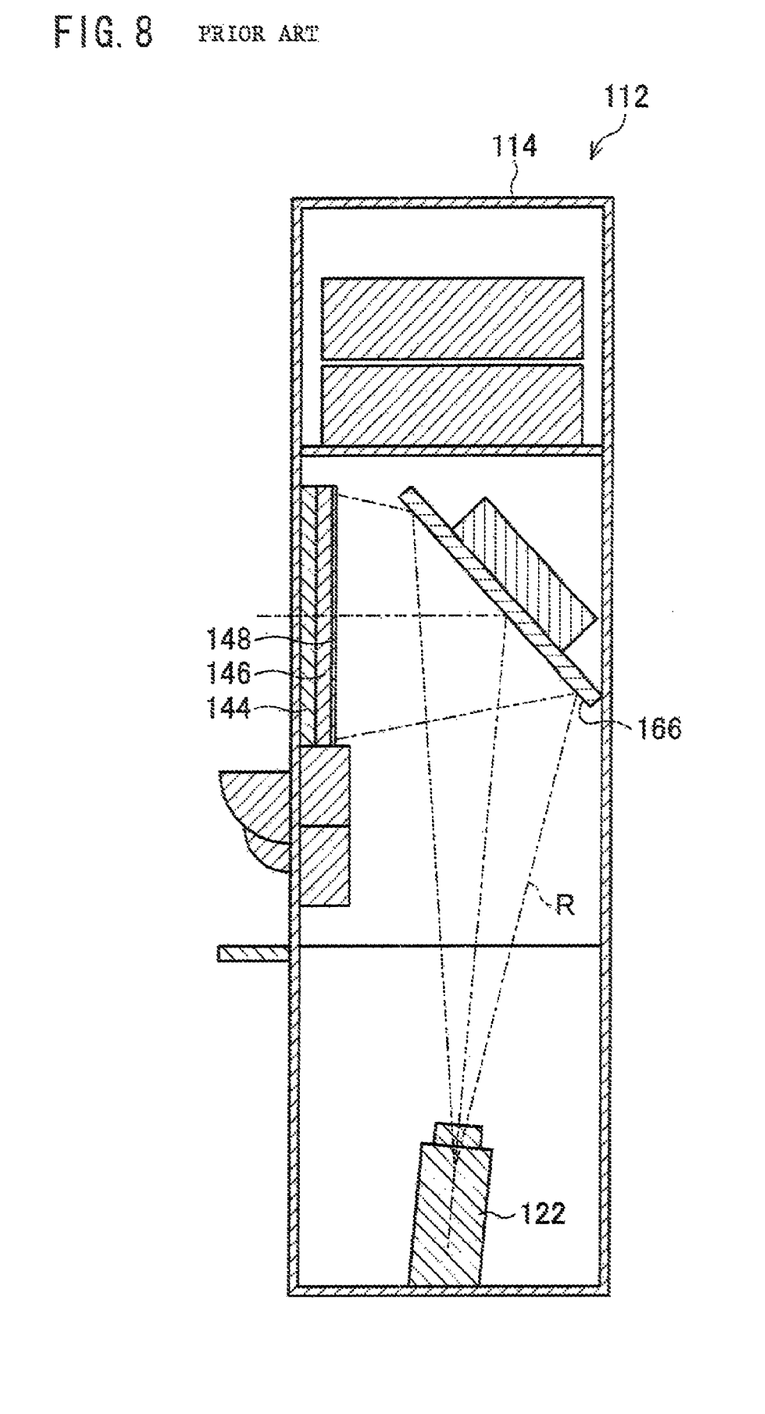
FIG. 8 shows a conventional art, and is a cross-sectional view showing a first arrangement of a gaming machine.

FIG. 8 illustrates an arrangement of a pachinko machine 112, which is a gaming machine disclosed in Patent Literature 1.

The pachinko machine 112 includes a projection section 122 in a lower portion of a housing 114. Projection light R for forming an image sent from the projection section 122 is reflected by a reflector 166 so as to enter a Fresnel lens 148, thereby being projected on a back surface of a screen 146. The projection light R projected on the screen 146 is displayed all over a gaming plate 144 that is provided at a front surface of the housing 114 so as to be in contact with the screen 146.

Figure 9:
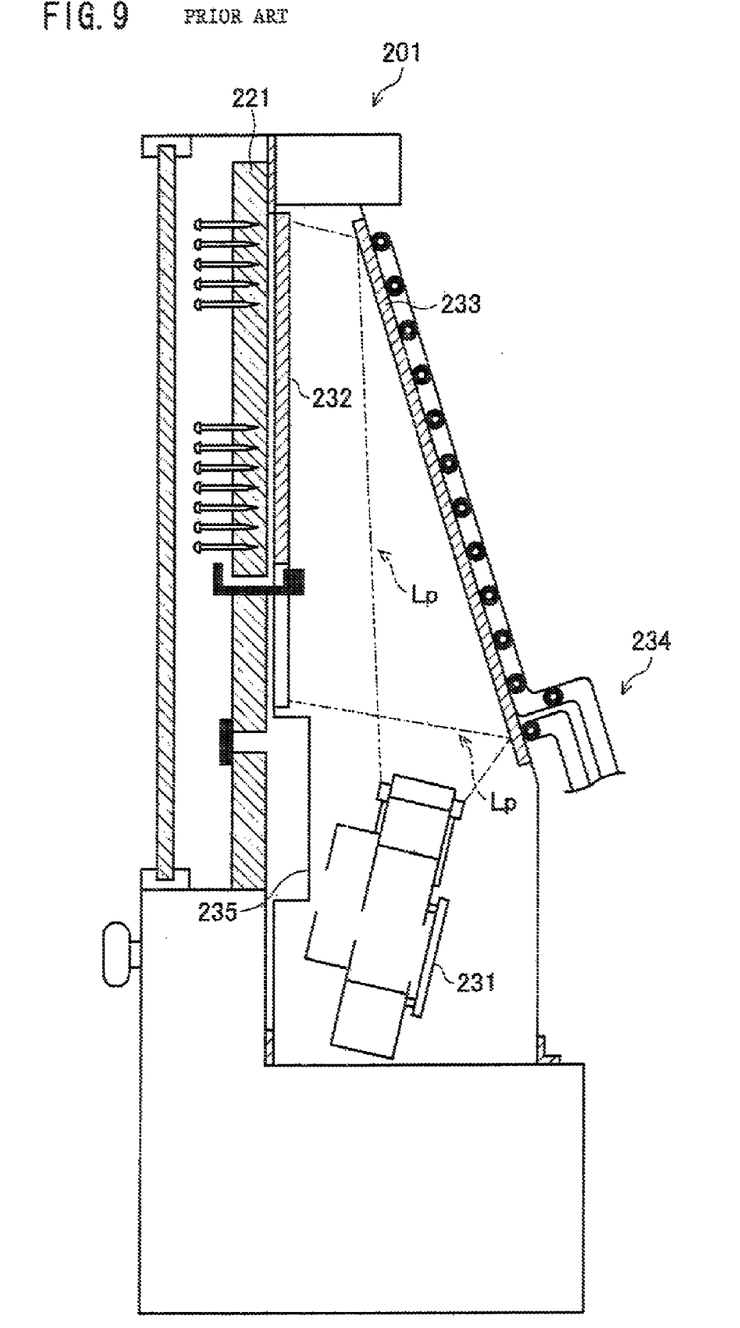
FIG. 9 shows a conventional art, and is a cross-sectional view showing a second arrangement of the gaming machine.

FIG. 9 illustrates an arrangement of a pachinko table 201, which is a gaming machine disclosed in Patent Literature 2.

The pachinko table 201 includes an optical engine 231 in a lower portion of a housing 235. Projection light Lp emitted from the optical engine 231 is reflected by a reflecting mirror 233 so as to be projected on a back surface of a screen panel 232. This causes the screen panel 232 to display a game image thereon. This image is viewed through a gaming plate 221 that is provided outside a front surface of the housing 235. Further, the pachinko table 201 includes a cooling device 234 provided on a backside of the reflecting mirror 233. The cooling device 234 absorbs heat in the housing 235 by using cooling water.

Patent Literature 1

Japanese Unexamined Patent Publication No. 2004-180770 (Tokukai 2004-180770) (publication date: Jul. 2, 2004)

Patent Literature 2

Japanese Unexamined Patent Publication No. 2005-111067 (Tokukai 2005-111067) (publication date: Apr. 28, 2005)

Patent Literature 3

Japanese Unexamined Patent Publication No. 2005-258016 (Tokukai 2005-258016) (publication date: Sep. 22, 2005)

DISCLOSURE OF INVENTION

However, both of the gaming machines disclosed in Patent Literatures 1 and 2 use a projection type display device, and therefore require a large space, in the housing, for projection performed by the display device. This causes a problem in that the gaming machine increases in cost as well as in entire size. Determining the size of the gaming machine depending on the display device also causes a decrease in degree of freedom for designing the entire gaming machine.

Further, as understood from the presence of the cooling device 234 in Patent Literature 2, the projection type display device generates a large amount of heat, and hence needs a peripheral member additionally. This causes a problem of cost increase.

As described above, the conventional gaming machine, in which the projection type display device is used in displaying a large screen, has difficulty in decreasing in size and cost.

The present invention has been accomplished in view of the problems above, and an object of the present invention is to realize a gaming machine including a display device that can display a large screen and can reduce the size and cost of the gaming machine.

In order to attain the object, a gaming machine of the present invention is a gaming machine including: a liquid crystal display device capable of emitting different image light of different images respectively in a first angular range and a second angular range; and a reflecting member for reflecting the image light emitted in the second angular range from the liquid crystal display device, the gaming machine displaying, by using the image light emitted in the first angular range from the liquid crystal display device and the image light reflected by the reflecting member, a background image on a gaming table on which a game is performed in response to an action of a player.

In this arrangement, the liquid crystal display device emits different image light of different images respectively in the first angular range and the second angular range so as to display the background image on the gaming table by using the image light emitted in the first angular range and the image light that is emitted in the second angular range and then reflected by the reflecting member. This makes it possible to display the background image of a large area by connecting an image formed from the image light emitted in the first angular range from the liquid crystal display device and an image formed from the image light reflected by the reflecting member. However, a display device in the gaming machine of the present invention has a display surface smaller than a size of the background image, and is a liquid crystal display device, which does not require a large space for projection unlike the projection type display device. Further, with the display device being the liquid crystal display device, it is unnecessary to provide a high-priced peripheral member such as a cooling device, unlike the projection type display device. In this way, it becomes possible to achieve a reduction in size and cost of the gaming machine.

With the arrangement, it is possible to realize a gaming machine including a display device that can display a large screen and can reduce the size and cost of the gaming machine.

In order to attain the object, the gaming machine of the present invention is arranged so that the liquid crystal display device and the reflecting member are connected to each other so that a display surface of the liquid crystal display device faces a reflecting surface of the reflecting member at an angle less than 180°.

With this arrangement, in which the liquid crystal display device and the reflecting member are connected to each other so that the display surface of the liquid crystal display device faces the reflecting surface of the reflecting member at the angle less than 180°, it is possible to display a background image produced by continuously connecting the image formed from the image light emitted in the first angular range from the liquid crystal display device and the image formed from the image light reflected by the reflecting member.

In order to attain the object, the gaming machine of the present invention is arranged so that the angle is adjustable.

With this arrangement, in which the angle between the display surface of the liquid crystal display device and the reflecting surface of the reflecting member is adjustable, it is possible to appropriately provide each player with the background image by adjusting the angle according to a position of the player in relation to the gaming machine.

In order to attain the object, the gaming machine of the present invention is arranged so that the reflecting surface of the reflecting member serves as a stage on which a member for performing the game is provided.

With this arrangement, in which the reflecting surface of the reflecting member serves as the stage on which the member for performing the game is provided, it is possible to achieve a further reduction in size of the gaming machine since a region on the reflecting member can be efficiently used as a region for performing the game.

In order to attain the object, the gaming machine of the present invention is arranged so that the reflecting surface of the reflecting member faces obliquely upward.

With this arrangement, in which the reflecting surface of the reflecting member faces obliquely upward, it is possible to perform a game that utilizes gravity such as a falling movement.

In order to attain the object, the gaming machine of the present invention is arranged so as to further include a stage on which a member for performing the game is provided, the stage being provided in front of the display surface of the liquid crystal display device and the reflecting surface of the reflecting member, the stage being such that the image light emitted in the first angular range from the liquid crystal display device and the image light reflected by the reflecting member pass through the stage.

With this arrangement, when the stage including the member for performing the game is provided in front of the display surface of the liquid crystal display device and the reflecting surface of the reflecting member, it is possible to display the background image on the gaming table by transmitting, through the stage, the image light emitted in the first angular range from the liquid crystal display device and the image light reflected by the reflecting member. Further, even with a large region for performing the game, it is possible to display the background image on the gaming table.

In order to attain the object, the gaming machine of the present invention is arranged so that the reflecting member has a mirror surface as a/the reflecting surface.

With this arrangement, it is possible to clearly form an image by reflecting, with the reflecting member, the image light emitted in the second angular range from the liquid crystal display device.

In order to attain the object, the gaming machine of the present invention is arranged so that one image is formed from the image light emitted in the first angular range and the image light reflected by the reflecting member.

With this arrangement, it is possible to produce a background image having a larger area than a screen of the liquid crystal display device.

In order to attain the object, the gaming machine of the present invention is arranged so that the angle is adjusted so that an angle between the display surface of the liquid crystal display device and a sight line of the player becomes equal to an angle between the reflecting surface of the reflecting member and the sight line of the player.

With this arrangement, it is possible to perform the most excellent display of the background image by setting the angle with respect to the sight line of the player.

In order to attain the object, the gaming machine of the present invention is arranged so as to be one selected from the group consisting of a pachinko machine, a slot machine, a pachinko slot machine, a pinball machine, and a smart ball machine.

With this arrangement, a general gaming machine can display a large screen and achieve a reduction in size and cost of the gaming machine.

Additional objects, features, and strengths of the present invention will be made clear by the description below. Further, the advantages of the present invention will be evident from the following explanation in reference to the drawings.

REFERENCE SIGNS LIST

1: GAMING TABLE
2: LIQUID CRYSTAL MODULE (LIQUID CRYSTAL DISPLAY DEVICE)
3: MIRROR MEMBER (REFLECTING MEMBER)
3a, 5a: MEMBER FOR PERFORMING GAME
5: STAGE
L1, L2: IMAGE LIGHT
P: PLAYER

BEST MODE FOR CARRYING OUT THE INVENTION

One embodiment of the present invention is described below with reference to FIGS. 1 through 7.

Figure 1:
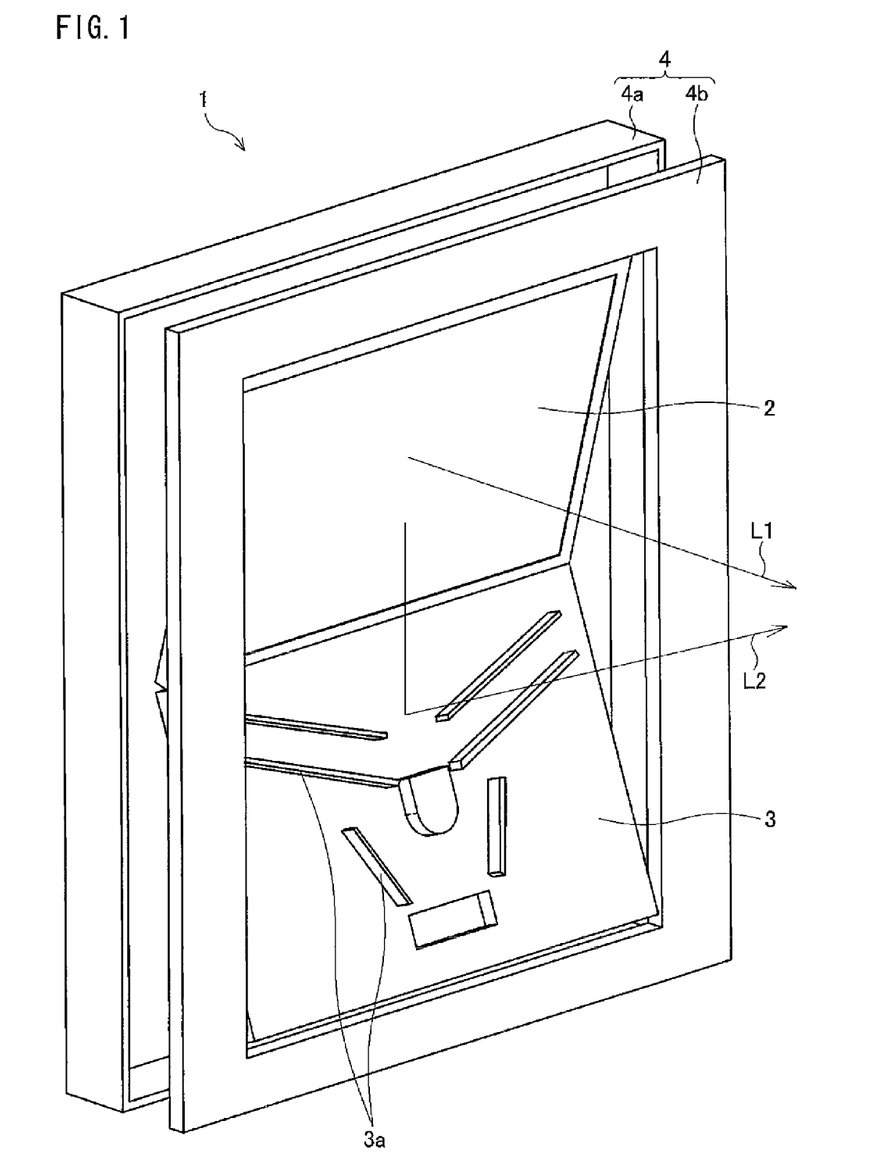
FIG. 1 shows an embodiment of the present invention, and is a perspective view showing an arrangement of a main part of a gaming table.

FIG. 1 illustrates an arrangement of a gaming table 1 to be provided in a gaming machine in accordance with the present embodiment.

The gaming table 1 includes a liquid crystal module 2, a mirror member 3, and a gaming table frame 4.

The liquid crystal module (liquid crystal display device) 2 is able to emit different image light of different images respectively in a first angular range and a second angular range. For example, the liquid crystal module 2 can be a liquid crystal display panel 301 shown in FIG. 5, disclosed in Patent Literature 3.

Figure 5:
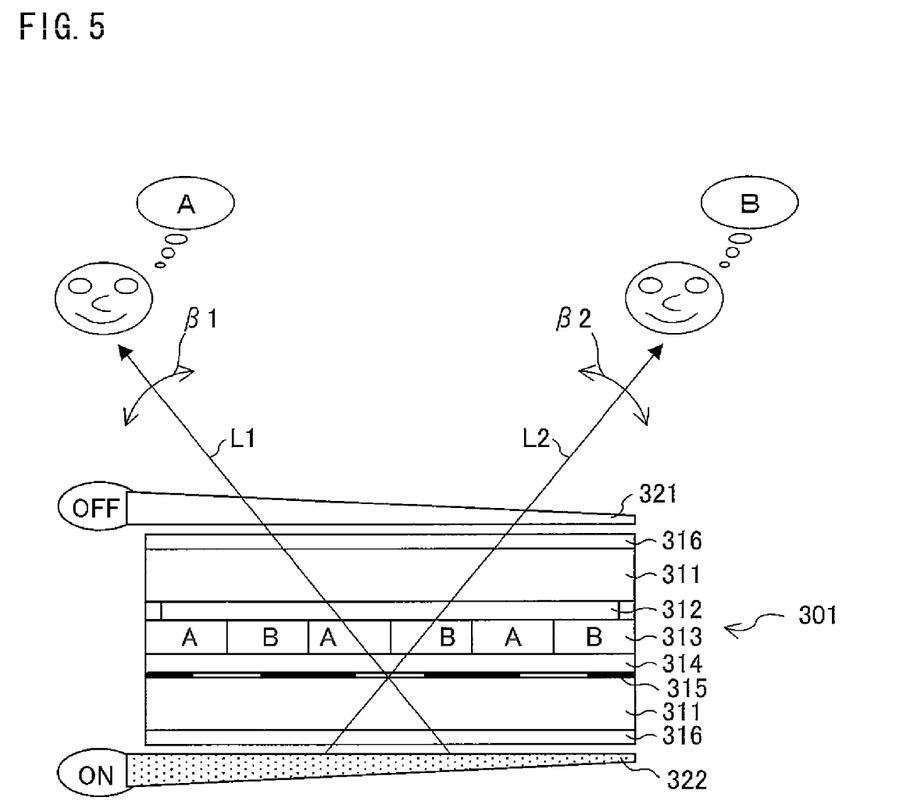
FIG. 5 is a cross-sectional view showing an arrangement of a liquid crystal display panel of a liquid crystal display device capable of dual image displaying.

The liquid crystal display panel 301 shown in FIG. 5 includes a liquid crystal layer 312, a color filter 313, a thick resin layer 314, and a parallax barrier layer 315, each of which is formed between two transparent substrates 311 on which a transparent electrode (not shown) and an alignment film (not shown) are formed. Further, a polarizing plate 316 is provided outside each of the two transparent substrates 311. Furthermore, a front light unit 321 is provided outside the polarizing plate 316 at a front surface (on an observer side) of the liquid crystal display panel 301; and a backlight unit 322 is provided outside the polarizing plate 316 at a back surface of the liquid crystal display panel 301.

Patent Literature 3 refers to, as "dual image display", the arrangement in which the liquid crystal display panel 301 emits different image light of different images respectively in the first angular range and the second angular range. The liquid crystal display panel 301 carries out the dual image display with the front light unit 321 turned off and the backlight unit 322 turned on. Among light emitted from the backlight unit 322, light passing through an area A in the color filter 313 via the parallax barrier layer 315 is regarded as image light L1, which travels in a direction toward an observer A. Meanwhile, among the light emitted from the backlight unit 322, light passing through an area B in the color filter 313 via the parallax barrier layer 315 is regarded as image light L2, which travels in a direction toward an observer B.

The image light L1 and L2 travel in respective directions that are inclined at a certain degree toward opposite sides to each other from the normal direction to the liquid crystal display panel 301. A first and second images are formed from the image light L1 and the image light L2, respectively, so as to be visually recognized. Since both of the first and second images have a certain viewing angle width, each of the image light L1 and L2 travels in a direction within a certain range. The image light L1 travels in a direction within an angular range (first angular range) β1, and the image light L2 travels in a direction within an angular range (second angular range) β2, wherein angles are measured with respect to the normal direction to the liquid crystal display panel 301.

The mirror member (reflecting member) 3 has a reflecting surface that reflects light, and is arranged herein so as to have a surface made into a mirror. The surface can be made into a mirror by using a known method, for example, by coating the surface with a metal film made from tin or by constituting the surface area with a polished metal body. The reflecting surface for reflecting the image light L2 is a mirror herein, however, is not limited to this, and that a condition of the reflecting surface is determined as appropriate according to a characteristic of an image to be formed from the reflected image light L2.

Further, members 3a for performing a game are provided on the reflecting surface of the mirror member 3. FIG. 1 shows an arrangement assumed as a pachinko table. The members 3a are members, such as a nail, an accessory, and a plate for guiding a pachinko ball. The members 3a are used to perform the game, that is, movement of the pachinko ball, by acting on the pachinko ball that serves as a gaming ball. Further, a hole for collecting the pachinko ball is provided on the reflecting surface. As described above, the reflecting surface of the mirror member 3 serves as a stage on which the members 3a for performing the game is provided. The members 3a for performing the game do not necessarily have a mirror surface.

The game is performed in response to an action of a player. In a case of the pachinko table, the action corresponds to launch of the pachinko ball carried out by the player. Apart from this, in general case of a gaming machine, the action of the player can be various types of actions which the gaming machine can recognize, such as operation of the gaming machine, insertion of a coin, voice production, application of force, application of pressure, and application of heat.

Figure 2:
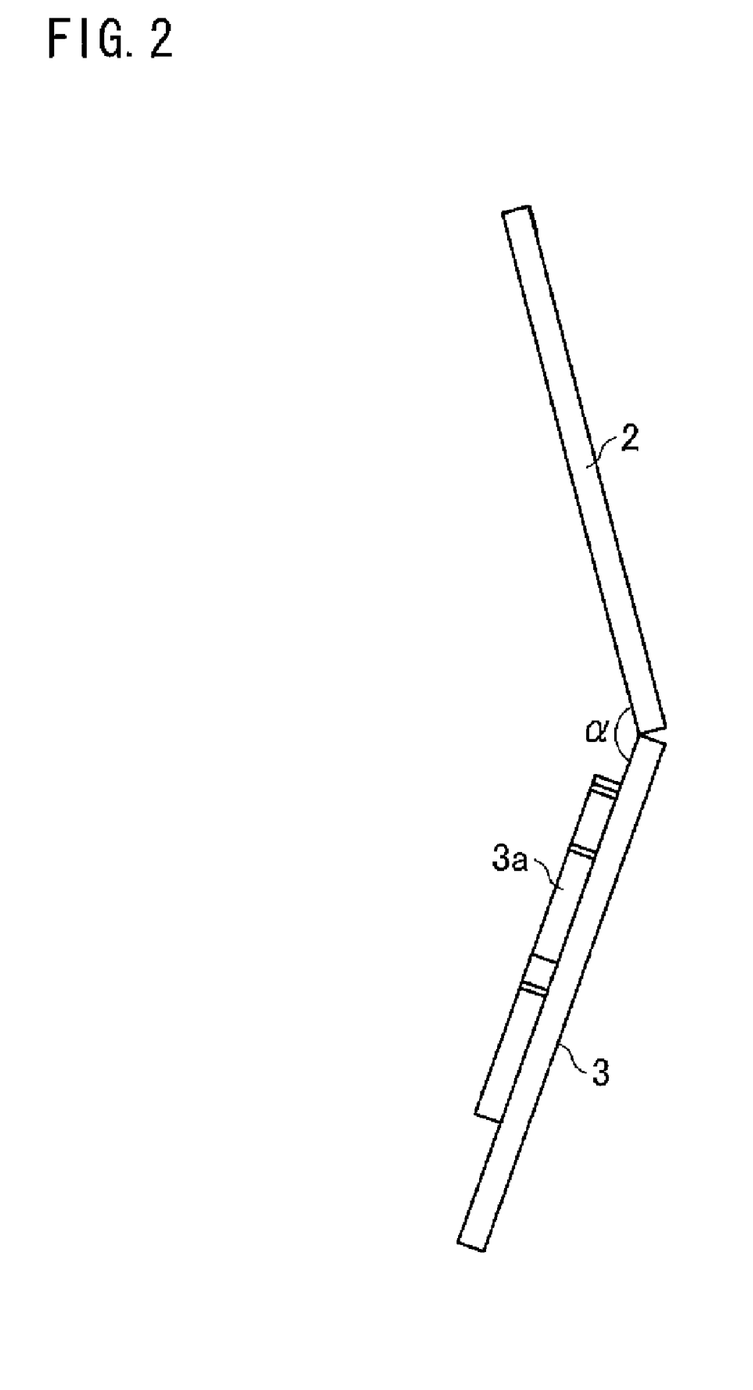
FIG. 2 is a side view of a liquid crystal display device and a reflecting member, each of which is provided in the gaming table shown in FIG. 1.

As shown in a side view in FIG. 2, the liquid crystal module 2 and the mirror member 3 are connected to each other so that a display surface of the liquid crystal module 2 faces the reflecting surface of the mirror member 3 at an angle α which is less than 180°. In FIG. 1, each of the liquid crystal module 2 and the mirror member 3 has a shape of rectangular plate, and one end side of the liquid crystal module 2 is connected to that of the mirror member 3. In this case, the liquid crystal module 2 and the mirror member 3 are provided in an upper portion and lower portion of the gaming table, respectively. Further, the liquid crystal module 2 is arranged so as to face such a direction that the image light L2 emitted from the display surface of the liquid crystal module 2 enters the reflecting surface of the mirror member 3.

The gaming table frame 4 has frames 4a and 4b. The frame 4a is a box-shaped member having enough depth to contain the liquid crystal module 2 and the mirror member 3. The frame 4b has a window and a window frame so as to serve as a cover of the frame 4a. By this, the frame 4b makes is possible to see, through the window from outside of the frame 4b, the display surface of the liquid crystal module 2 and the reflecting surface of the mirror member 3, which are contained in the frame 4a.

Figure 3:
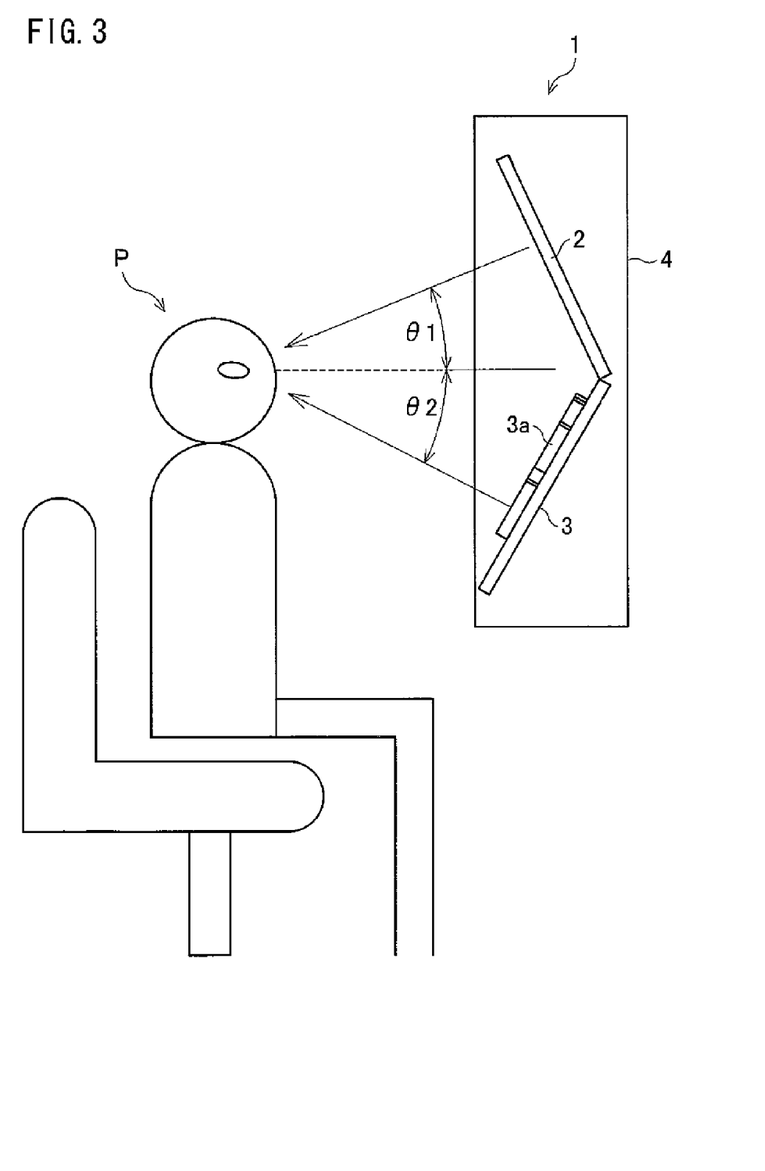
FIG. 3 is a side view showing a positional relation of a player to the liquid crystal display device and the reflecting member of the gaming table shown in FIG. 1.
Figure 4:
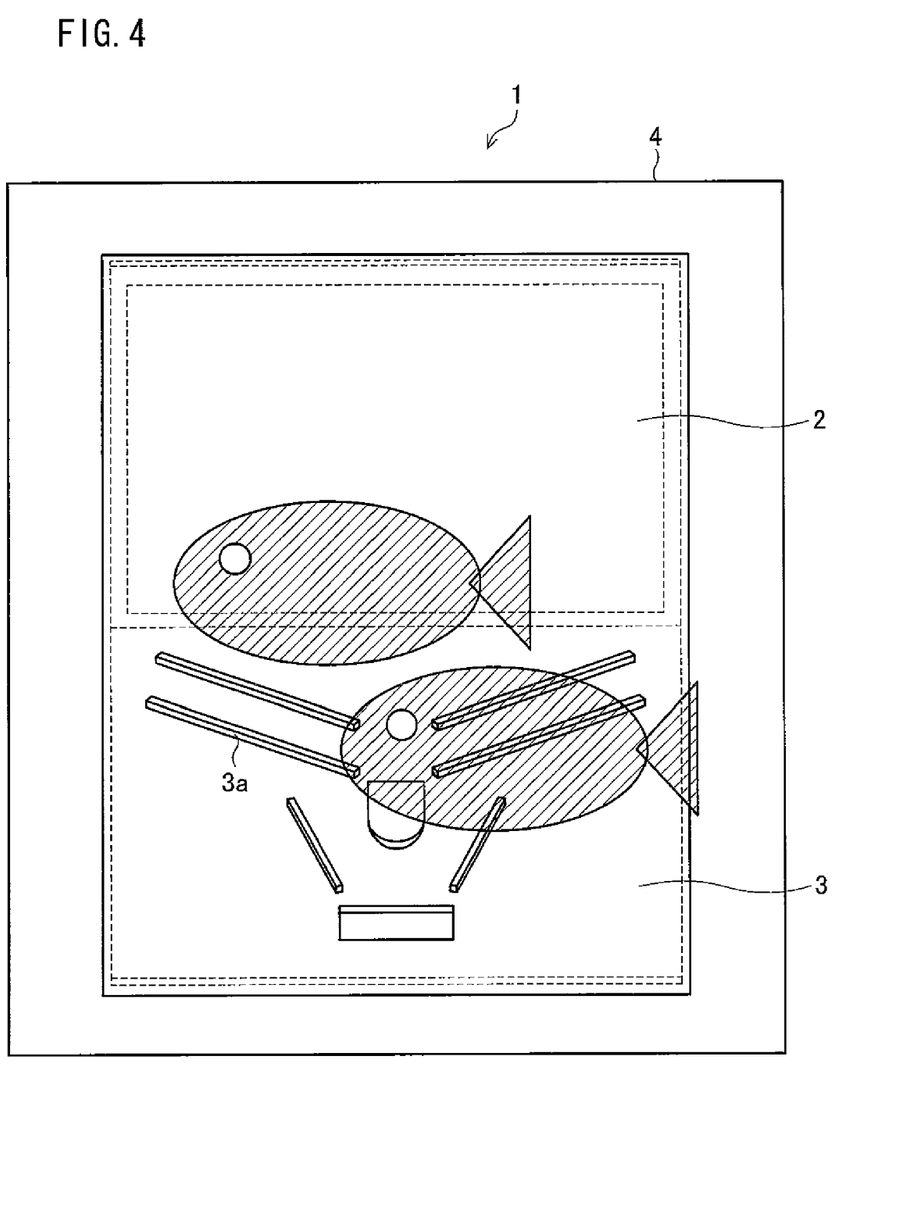
FIG. 4 is an elevation view showing a background image on a gaming table constituted by the liquid crystal display device and the reflecting member of the gaming table shown in FIG. 1.

In the gaming table 1 arranged as above, the image light L1 emitted from the display surface of the liquid crystal module 2 arrives, directly through the window of the frame 4b, at a player P in front of the gaming table, which player is shown in FIG. 3. Meanwhile, the image light L2 emitted from the display surface of the liquid crystal module 2 is reflected by the reflecting surface of the mirror member 3 and then also arrives at the player P through the window of the frame 4b. The player P recognizes the first image formed from the image light L1 and the second image formed from the image light L2. In this way, the first and second images are supplied to the player P as a background image on the gaming table 1. Since the liquid crystal module 2 and the mirror member 3 are connected to each other, the first image and the second image are continuously connected so as to form the background image. The first image and the second image constitute an upper part and lower part of this background image, respectively. By supplying image data to the liquid crystal module 2 so that the first and second images collectively constitute one image, it becomes possible to produce a background image having a large screen as shown in FIG. 4.

FIG. 3 shows a positional relation between a gaming table 1 and a player P. An optimal display of a background image can be performed when an angle θ1 between a display surface of a liquid crystal module 2 and a sight line of the player P is substantially equal to an angle θ2 between a reflecting surface of a mirror member 3 and the sight line of the player P. Since the sight line varies among the players P, it is preferable to arrange so that the angle α, shown in FIG. 2, between the display surface of the liquid crystal module 2 and the reflecting surface of the mirror member 3 is adjustable so as to be adjusted depending on the player P. This makes it possible to appropriately provide each of the players P with the background image by adjusting the angle α according to a position of the player P in relation to the gaming machine. Alternately, it is also possible to arrange so that the entire gaming table 1 is vertically movable. By this, the gaming table 1 can be adjusted with the angle α kept constant, so as to be at the same height as the horizontal sight line of the player P.

Figure 6:
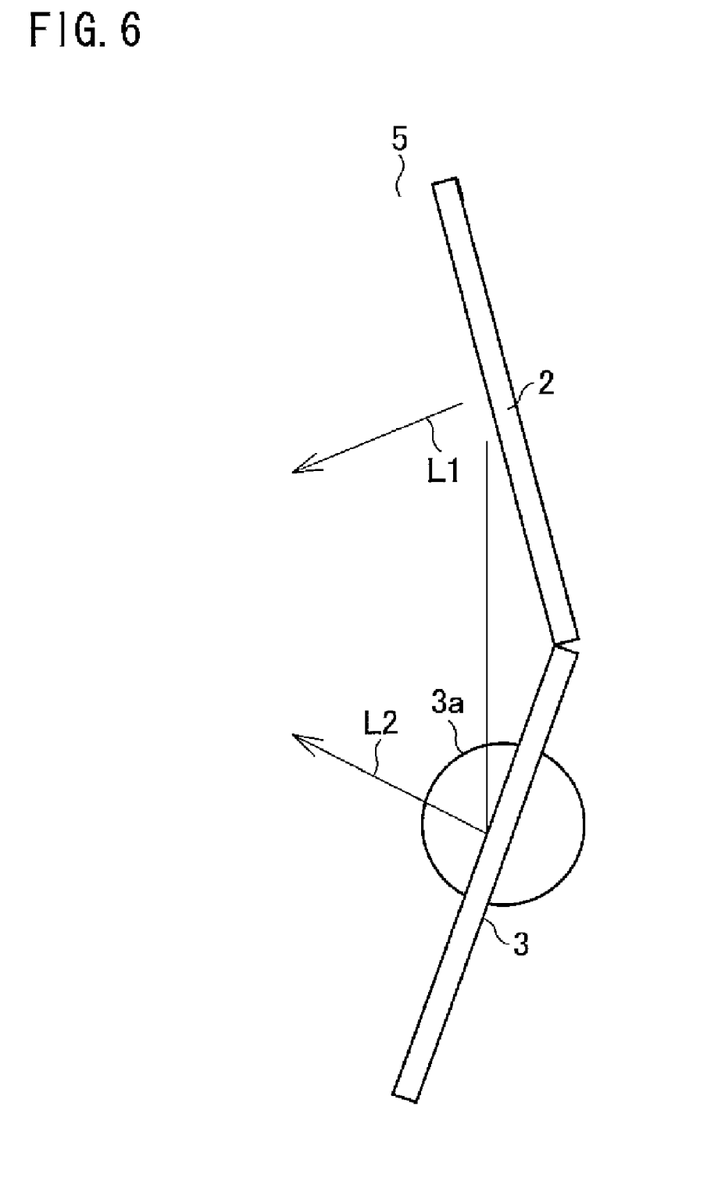
FIG. 6 shows an embodiment of the present invention, and is a side view showing an arrangement of a main part of a first modification of the gaming table.

FIG. 6 shows a simplified side view of an arrangement of a gaming table 1 used as a slot machine or a pachinko slot machine, which gaming table 1 includes a liquid crystal module 2 and a mirror member 3. The liquid crystal module 2 has the same configuration as one in FIG. 1, except that the mirror member 3 differs from one shown in FIG. 1 in that a drum is provided in the center thereof as a member 3a for performing a game. One or a plurality of reels rotate in this drum. Image light L2 emitted from a display surface of the liquid crystal module 2 is reflected by a reflecting surface in a region other than the drum.

It is possible to constitute an entire gaming machine by combining the gaming table 1 with other driving system, a power supply system, a trestle and the like.

According to the present embodiment, it is possible to display a background image of a large area by connecting the first image, which is formed from the image light L1 emitted from the liquid crystal module 2, to the second image, which is formed from the image light L2 reflected by the mirror member 3. However, a display device of the present embodiment has a display surface that is smaller than a size of the background image, and is a liquid crystal display device, which does not require a large space for projection unlike a projection type display device. Further, when the display device is the liquid crystal display device, it is unnecessary to provide a high-priced peripheral member such as a cooling device, unlike the projection type display device. In this way, it becomes possible to achieve a reduction in size and cost of the gaming machine.

With the arrangement above, it is possible to realize a gaming machine including a display device that can display a large screen and can reduce the size and cost of the gaming machine.

Further, with the arrangements shown in FIGS. 1 and 6, in which the reflecting surface of the mirror member 3 serves as a stage on which the member 3a for performing the game is provided, it is possible to achieve a further reduction in size of the gaming machine since a region on the mirror member 3 can be efficiently used as a region for performing the game.

Furthermore, when the reflecting surface of the mirror member 3, serving as the stage, is arranged so as to face obliquely upward as shown in FIG. 1, it is possible to perform a game that utilizes gravity such as a falling movement, as in pachinko, pinball, smart ball, and the like.

Figure 7:
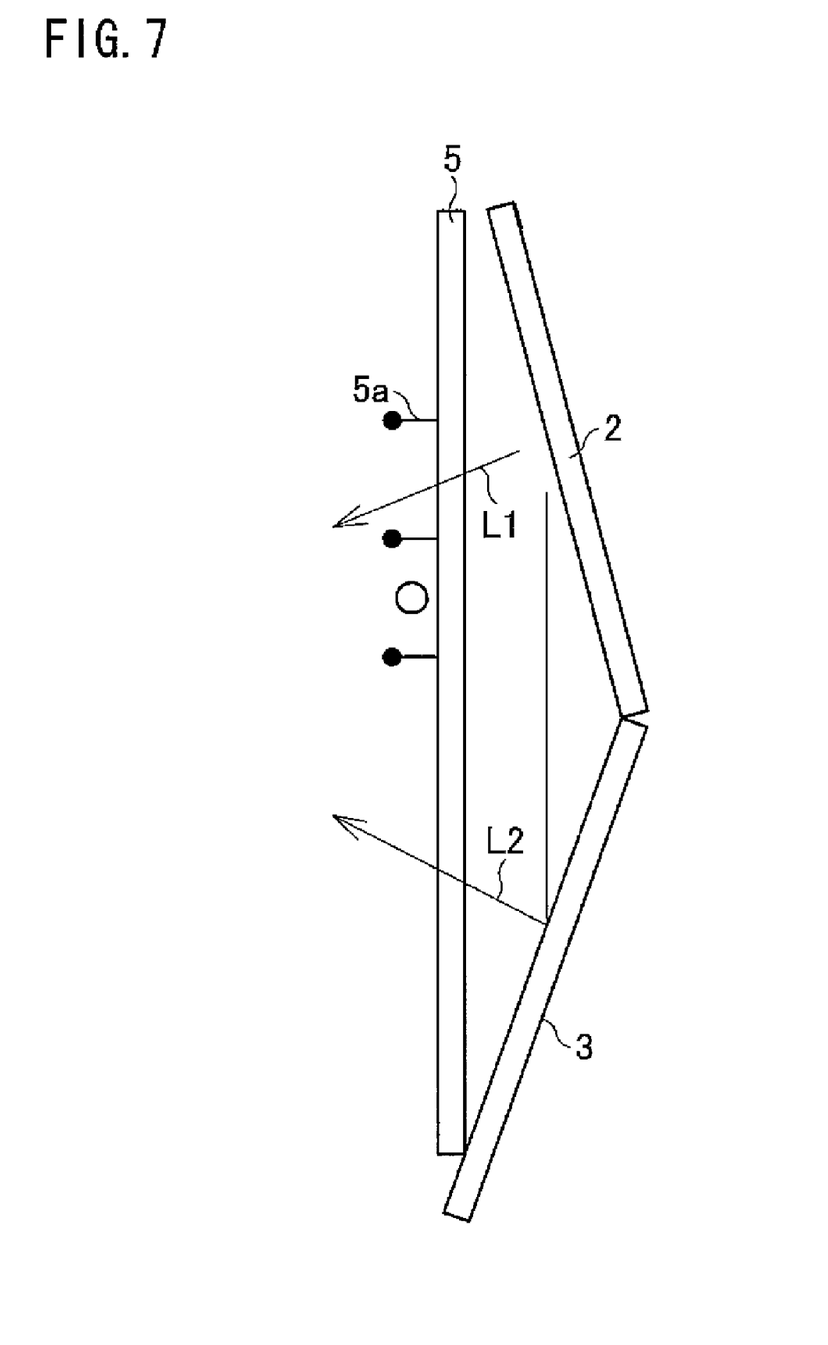
FIG. 7 shows an embodiment of the present invention, and is a side view showing an arrangement of a main part of a second modification of the gaming table.

FIG. 7 illustrates the other arrangement of the gaming table 1.

This gaming table 1 differs from the arrangement shown in FIG. 1 in that a mirror member 3 does not include a member 3a for performing a game, and that a stage 5 including a member 5a for performing the game is provided in front of a display surface of a liquid crystal module 2 and a reflecting surface of a mirror member 3. The stage 5 is a transparent plate made from an acrylic resin, and transmits image light L1 and L2.

This arrangement also makes it possible to display a background image on the gaming table 1 by transmitting the image light L1 and L2 through the stage 5. Further, even in a case where a region on which the game is performed is large like the stage 5, it is possible to display the background image on the gaming table 1.

Further, image data to be supplied to the above-mentioned liquid crystal module 2 can be not only still image data but also moving image data. It is possible to arbitrarily change the background image on the gaming table by changing the image data to be supplied. This makes it possible to provide a player with a wide variety of visual effects. The image data may be stored in the liquid crystal module 2 or may be supplied to the liquid crystal module 2 from outside of the liquid crystal module 2.

In the above-mentioned gaming machine, the liquid crystal display device and the reflecting member are connected to each other so as to form the background image as one screen. However, the present invention is not limited to this. The liquid crystal display device and the reflecting member may not be connected to each other so as to form a plurality of screens that are separated from each other.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a gaming machine of the present invention is a gaming machine including: a liquid crystal display device capable of emitting different image light of different images respectively in a first angular range and a second angular range; and a reflecting member for reflecting the image light emitted in the second angular range from the liquid crystal display device, the gaming machine displaying, by using the image light emitted in the first angular range from the liquid crystal display device and the image light reflected by the reflecting member, a background image on a gaming table on which a game is performed in response to an action of a player.

With this arrangement, it is possible to realize a gaming machine including a display device that can display a large screen and can reduce the size and cost of the gaming machine.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below

INDUSTRIAL APPLICABILITY

The present invention is suitably applicable to a gaming machine of pachinko, slot, pachinko slot, pinball, smart ball, and the like.

The invention claimed is:

1. A gaming machine comprising:
a liquid crystal display device capable of emitting different image light of different images respectively in a first angular range and a second angular range; and
a reflecting member for reflecting the image light emitted in the second angular range from the liquid crystal display device,
the gaming machine displaying, by using the image light emitted in the first angular range from the liquid crystal display device and the image light reflected by the reflecting member, a background image on a gaming table on which a game is performed in response to an action of a player,
wherein the reflecting surface of the reflecting member serves as a stage on which a member for performing the game is provided.

2. The gaming machine according to claim 1, wherein the liquid crystal display device and the reflecting member are connected to each other so that a display surface of the liquid crystal display device faces a reflecting surface of the reflecting member at an angle less than 180°.

3. The gaming machine according to claim 2, wherein the angle is adjustable.

4. The gaming machine according to claim 1, wherein the reflecting surface of the reflecting member faces obliquely upward.

5. The gaming machine according to claim 1, wherein the reflecting member has a mirror surface as a/the reflecting surface.

6. The gaming machine according to claim 1, wherein one image is formed from the image light emitted in the first angular range and the image light reflected by the reflecting member.

7. The gaming machine according to any one of claims 3 or 4, wherein the angle is adjusted so that an angle between the display surface of the liquid crystal display device and a sight line of the player becomes equal to an angle between the reflecting surface of the reflecting member and the sight line of the player.

8. The gaming machine according to claim 1, being one selected from the group consisting of a pachinko machine, a slot machine, a pachinko slot machine, a pinball machine, and a smart ball machine.

* * * * *